(12) United States Patent
Vincent et al.

(10) Patent No.: US 10,619,740 B2
(45) Date of Patent: Apr. 14, 2020

(54) SEAL ASSEMBLY

(71) Applicant: AIRBUS OPERATIONS LIMITED, Bristol (GB)

(72) Inventors: Tristan Vincent, Bristol (GB); Kim Sharp, Bristol (GB); David Hoptroff, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 516 days.

(21) Appl. No.: 15/384,949

(22) Filed: Dec. 20, 2016

(65) Prior Publication Data

US 2017/0175895 A1   Jun. 22, 2017

(30) Foreign Application Priority Data

Dec. 21, 2015 (GB) .................................... 1522486.8

(51) Int. Cl.
*F16J 15/02* (2006.01)
*F16J 15/00* (2006.01)
(Continued)

(52) U.S. Cl.
CPC ................. *F16J 15/02* (2013.01); *B64C 3/50* (2013.01); *B64C 9/02* (2013.01); *B64C 9/16* (2013.01);
(Continued)

(58) Field of Classification Search
CPC .... B64C 3/00; B64C 3/50; B64C 9/02; B64C 9/16; B64C 9/18; B64C 9/20; F16J 15/16; F16J 15/164; F02C 7/28; F02K 1/805
See application file for complete search history.

(56) References Cited

U.S. PATENT DOCUMENTS 2,403,770 A     7/1946   Zelm
2,444,293 A *   6/1948   Holt ........................ B64C 21/08
                                                                     244/129.1
(Continued)

FOREIGN PATENT DOCUMENTS

| CA | 2852494 | 11/2014 |
|---|---|---|
| CN | 104044728 | 9/2014 |
| EP | 0 947 421 | 10/1999 |

OTHER PUBLICATIONS

Search and Examination Report for GB 1522486.8, dated May 31, 2016, 8 pages.

(Continued)

*Primary Examiner* — Michael H Wang
(74) *Attorney, Agent, or Firm* — Nixon & Vanderhye P.C.

(57) ABSTRACT

An aircraft wing has a fixed wing portion and a trailing edge flap movable with respect to the fixed wing portion to define a gap between the fixed wing and the flap. A seal assembly has a first rigid seal member fixed to the fixed wing portion and a second resilient seal member fixed to an upper surface leading edge portion of the flap. The trailing edge flap is deployable between a first flap position in which the trailing edge flap conforms to a profile of the fixed wing portion, a second flap position in which the trailing edge flap is deflected upwardly from the first flap position, and a third flap position in which the trailing edge flap is deflected downwardly from the first flap position. In the first flap position the first seal member contacts the second seal member to at least partially seal the gap, and in the second flap position the first seal member presses against the second seal member and deflects the second seal member to at least partially seal the gap.

13 Claims, 3 Drawing Sheets

(51) Int. Cl.
*F02C 7/28* (2006.01)
*F02K 1/80* (2006.01)
*B64C 9/02* (2006.01)
*B64C 9/16* (2006.01)
*B64C 3/50* (2006.01)
*B64C 9/20* (2006.01)
*B64C 9/14* (2006.01)

(52) U.S. Cl.
CPC ............... *B64C 9/20* (2013.01); *F02C 7/28* (2013.01); *F02K 1/805* (2013.01); *F16J 15/00* (2013.01); *B64C 2009/143* (2013.01)

(56) References Cited

U.S. PATENT DOCUMENTS

| | | | | |
|---|---|---|---|---|
| 4,015,787 | A * | 4/1977 | Maieli | B64C 9/20 244/113 |
| 4,120,470 | A | 10/1978 | Whitener | |
| 4,131,252 | A * | 12/1978 | Dean | B64C 9/16 244/130 |
| 4,553,722 | A * | 11/1985 | Cole | B64C 3/48 244/219 |
| 4,706,913 | A * | 11/1987 | Cole | B64C 3/48 244/214 |
| 4,823,836 | A * | 4/1989 | Bachmann | F16K 1/223 137/601.06 |
| 4,962,902 | A | 10/1990 | Fortes | |
| 5,222,692 | A * | 6/1993 | Glowacki | F01D 11/005 244/129.1 |
| 5,388,788 | A * | 2/1995 | Rudolph | B64C 7/00 244/212 |
| 5,735,485 | A | 4/1998 | Ciprian et al. | |
| 6,450,457 | B1 * | 9/2002 | Sharp | B64C 7/00 244/212 |
| 7,051,982 | B1 * | 5/2006 | Johnson | B64C 7/00 244/129.1 |
| 9,688,384 | B1 * | 6/2017 | Balzer | B64C 13/28 |
| 2007/0252040 | A1 * | 11/2007 | Kordel | B64C 7/00 244/123.1 |
| 2010/0286849 | A1 | 11/2010 | Huynh et al. | |
| 2010/0288887 | A1 * | 11/2010 | Parker | B64C 7/00 244/213 |
| 2011/0031349 | A1 * | 2/2011 | Wildman | B64C 9/02 244/123.1 |
| 2011/0133411 | A1 * | 6/2011 | Wildman | B64C 7/00 277/345 |
| 2011/0174933 | A1 * | 7/2011 | Blades | B64C 7/00 244/213 |
| 2014/0001309 | A1 | 1/2014 | Tieys et al. | |
| 2015/0082708 | A1 | 3/2015 | Eilken et al. | |
| 2017/0167610 | A1 * | 6/2017 | Blades | B64C 7/00 |
| 2017/0174315 | A1 * | 6/2017 | Neal | B64C 9/02 |
| 2017/0283034 | A1 * | 10/2017 | Balzer | B64C 3/50 |
| 2018/0236858 | A1 * | 8/2018 | Lunn | B60J 10/88 |

OTHER PUBLICATIONS

European Search Report cited in EP 16 20 3459 completed Feb. 23, 2017, 8 pages.

* cited by examiner

SEAL ASSEMBLY

RELATED APPLICATION

This application claims priority to Great Britain Patent Application 1522486.8, filed Dec. 21, 2015, the entirety of which is incorporated by reference.

FIELD OF THE INVENTION

The present invention relates to a seal assembly for an aircraft, an aircraft wing, and to methods for sealing a gap on an aircraft.

BACKGROUND OF THE INVENTION

On an aircraft wing, a trailing edge flap is typically mounted so as to be movable between a retracted position and one or more extended positions for increasing the maximum lift coefficient of the wing. The flap deployment typically comprises a downward deflection, which may be effected by a downward rotary movement and/or a movement in the aft/downward direction with respect to the fixed wing.

A spoiler is a lift dumping device typically provided on the upper aerodynamic surface of the wing between the fixed wing and the trailing edge flap so as to overlay the flap when they are both in their respective retracted positions. The spoiler typically moves between a retracted (0 degree) cruise position and an upwardly extended (positive rotation angle) lift dump position. A so-called droop spoiler can also be moved to a downwardly extended (negative rotation angle) position when the flap is partially or fully deployed for take-off and landing configurations, so as to manage the gap between the spoiler and the flap. Managing this gap can significantly improve the aerodynamic performance of the wing in a high lift configuration.

It is generally desirable that the lateral extent of each set of flaps and spoilers (inboard and outboard) is approximately coincident in the wing spanwise direction. However this is not always achievable in practice, often due to packaging constraints.

Drooping spoilers may suffer particularly from packaging constraints since the drooped spoiler partially occupies the position vacated by the deployed flap, which may require that the lateral extent of the spoiler is cut back from the lateral extent of the flap to avoid a clash between the spoiler in its drooped position and the flap support/drive mechanism.

A variable camber wing is a wing that allows relatively small changes in the camber of the aerofoil profile. The trailing edge flaps and spoilers may form part of a variable camber wing system whereby the flaps and spoilers may deflect through relatively small angles (up to around plus/minus 3 degrees) from their nominal cruise retracted (0 degree) position.

Depending on the flap and spoiler configuration and their intended deployment it may be necessary to cut back the fixed wing structure to avoid clashing with the movement of the flight control surfaces. However any gaps which are opened up between the fixed wing structure and the flight control surfaces due to this cut back should also be managed to ensure aerodynamic performance is not degraded significantly, particularly during the cruise.

SUMMARY OF THE INVENTION

A first aspect of the invention provides a seal assembly for an aircraft having a fixed aerofoil portion and a control surface movable with respect to the fixed aerofoil portion to define a gap therebetween, the seal assembly comprising: a first seal member having a first proximal portion and a first distal portion, wherein the first proximal portion is configured to be fixed to the fixed aerofoil portion and the first distal portion is configured to extend outwardly from the fixed aerofoil portion towards the control surface; and a second seal member having a second proximal portion and a second distal portion, wherein the second proximal portion is configured to be fixed to the control surface and the second distal portion is configured to extend outwardly from the control surface towards the fixed aerofoil portion, wherein the first distal portion has an edge at an extent thereof nearest the second seal member, and wherein the edge of the first distal portion is configured to press against the second distal portion and deflect the second distal portion so as to at least partially cover the gap between the fixed aerofoil portion and the control surface.

A second aspect of the invention provides an aircraft wing having a control surface spaced apart from a fixed aerofoil portion to define a gap therebetween, and a seal assembly according to the first aspect.

The edge of the first distal portion may be configured to press against the second distal portion and deflect the second distal portion as the control surface moves relative to the fixed aerofoil portion.

The edge of the first distal portion may be configured to press against the second distal portion and deflect the second distal portion as the control surface rotates in a first direction relative to the fixed aerofoil portion, and wherein the edge of the first distal portion may be configured to separate from the second distal portion when the control surface rotates in a second direction opposite the first direction.

The fixed aerofoil portion may be a fixed wing portion and the control surface may be a trailing edge flap.

The edge of the first distal portion may be configured to press against the second distal portion as the trailing edge flap rotates upwardly relative to the fixed wing portion, and wherein the edge of the first distal portion may be configured to separate from the second distal portion when the trailing edge flap rotates downwardly relative to the fixed wing portion.

The second seal member may be formed from a resilient material and the first seal member may be formed from a stiff material different than the resilient material.

The first seal member may be a seal panel.

The second distal portion may include an outer surface, and the edge of the first distal portion may be configured to contact the outer surface as the control surface moves relative to the fixed aerofoil portion.

The second distal portion may include a void beneath the outer surface into which the outer surface is configured to deflect as the edge of the first distal portion presses against the outer surface of the second distal portion.

The fixed aerofoil portion may be a fixed wing portion and the control surface may be a trailing edge flap, wherein the trailing edge flap is deployable between a first flap position in which the trailing edge flap conforms to a profile of the fixed wing portion, a second flap position in which the trailing edge flap is deflected upwardly from the first flap position, and a third flap position in which the trailing edge flap is deflected downwardly from the first flap position.

The aircraft wing may further comprise a spoiler which at least partially overlays the trailing edge flap, and wherein the spoiler is deployable between a first spoiler position in which the spoiler conforms to a profile of the fixed wing portion, a second spoiler position in which the spoiler is deflected upwardly from the first spoiler position, and a third spoiler position in which the spoiler is deflected downwardly from the first spoiler position.

The aircraft wing may further comprise a spoiler which at least partially overlays the trailing edge flap, and wherein the trailing edge flap is the most outboard flap across the wing span wise direction, and the spoiler is the most outboard spoiler across the wing span wise direction, and the trailing edge flap has an outboard edge positioned further outboard in the span wise direction than an outboard edge of the spoiler.

The first seal member may be positioned between the outboard edge of the spoiler and the outboard edge of the flap.

A third aspect of the invention provides an aircraft wing comprising a fixed wing portion, a trailing edge flap movable with respect to the fixed wing portion to define a gap there between, and a seal assembly for sealing the gap, wherein the seal assembly comprises a first rigid seal member fixed to the fixed wing portion and a second resilient seal member fixed to an upper surface leading edge portion of the flap, wherein the trailing edge flap is deployable between a first flap position in which the trailing edge flap conforms to a profile of the fixed wing portion, a second flap position in which the trailing edge flap is deflected upwardly from the first flap position, and a third flap position in which the trailing edge flap is deflected downwardly from the first flap position, and wherein in the first flap position the first seal member contacts the second seal member to at least partially seal the gap, and in the second flap position the first seal member presses against the second seal member and deflects the second seal member to at least partially seal the gap.

In the first flap position the second seal member may lie substantially flush with the upper surface of the fixed wing portion and the upper surface of the flap.

The second seal member may include a void beneath the upper surface into which the upper surface is configured to deflect as the first seal member presses against the upper surface of the second seal member.

A fourth aspect of the invention provides a method for sealing a gap between a fixed aerofoil portion and a control surface movable with respect to the fixed aerofoil portion on an aircraft, the method comprising: fixing a first proximal portion of a first seal member to the fixed aerofoil portion such that a first distal portion of the first seal member extends outwardly from the fixed aerofoil portion towards the control surface; and fixing a second proximal portion of a second seal member to the control surface such that a second distal portion of the second seal member extends outwardly from the control surface towards the fixed aerofoil portion, and pressing against the second distal portion with an edge of the first distal portion at an extent thereof nearest the second seal member so as to deflect the second distal portion.

A fifth aspect of the invention provides a method for sealing a gap between a fixed wing portion and a trailing edge flap movable with respect to the fixed wing portion on an aircraft, the method comprising: fixing a first rigid seal member to the fixed wing portion; fixing a second resilient seal member to an upper surface leading edge portion of the flap, positioning the flap in a first flap position in which the flap conforms to a profile of the fixed wing portion and in which the first seal member contacts the second seal member to at least partially seal the gap, positioning the flap in a second flap position in which the flap is deflected upwardly from the first flap position and in which the first seal member presses against the second seal member and deflects the second seal member to at least partially seal the gap, and positioning the flap in a third flap position in which the flap is deflected downwardly from the first flap position and in which the first seal member separates from the second seal member to open the gap.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
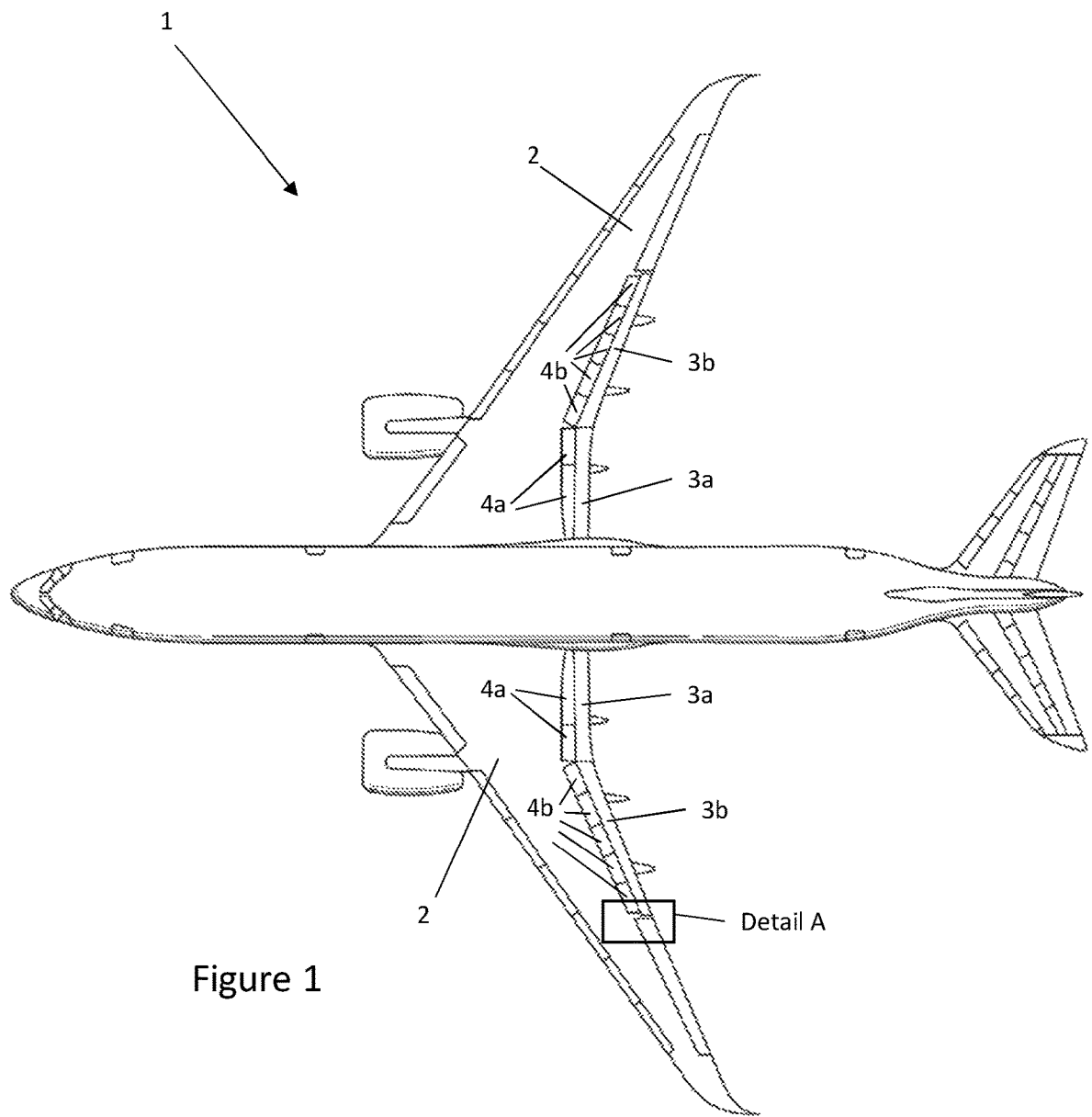
FIG. 1 illustrates a plan view of an aircraft having a fixed wing with trailing edge flaps and spoilers.

FIG. 1 illustrates a plan view of a fixed wing aircraft 1, which in this particular embodiment is a large commercial passenger jet aircraft, although it will be appreciated that this invention has broad applicability to a wide variety of aircraft types including military and transport aircraft, jet and turboprop aircraft, swept and unswept winged aircraft, etc. The aircraft 1 has a swept transonic wing 2 with trailing edge flaps including inboard flaps 3a and outboard flaps 3b. Inboard spoilers 4a and outboard spoilers 4b are provided on the upper aerodynamic surface of the wing 2 between the fixed wing structure and the trailing edge flaps 3a, 3b, so as to overlay (at least partially) the respective flaps when the flaps and spoilers are both in their retracted nominal cruise (0 degree) position.

The inboard and outboard flaps 3a, 3b, are mounted with respect to the fixed portion of the wing 2 so as to be moveable between the retracted nominal cruise (0 degree) position and one or more downwardly extended (negative rotation angle) positions for increasing the maximum lift coefficient of the wing, e.g. for take-off and landing low speed configurations. The spoilers 4a, 4b, are lift dumping devices which are mounted with respect to the fixed portion of the wing 2 so as to overlay the trailing edge flaps 3a, 3b, respectively, and to move between a retracted nominal cruise (0 degree) position and an upwardly extended (positive rotation angle) lift dump position.

The spoilers 4a, 4b, are also moveable to a downwardly extended (negative rotation angle) drooped position when the flaps 3a, 3b, are partially or fully deployed for take-off and landing configurations, so as to manage the gap or slot between the spoiler and the flap. Managing this gap improves the aerodynamic performance of the wing in high lift, low speed configurations.

The flaps 3a, 3b, and spoilers 4a, 4b, also form part of a variable camber wing system whereby the flaps and spoilers are moved through relatively small angles (up to around +/−3 degrees) from their nominal cruise retracted (0 degree) position to adjust the camber of the aerofoil profile of the wing 2 during high speed (cruise) flight. The variable camber wing system controls the flaps and spoilers such that the upper surface of the wing 2 remains "clean" by controlling the spoilers to follow the flap deployment through positive and negative angles of rotation such that the spoilers remain substantially in contact with the flap upper aerodynamic surface throughout the limited range of movement of the flaps and spoilers available to the variable camber wing system. Maintaining a clean upper aerodynamic surface of the wing is important to avoid drag penalties that any break in the upper aerodynamic surface may contribute to. The particular area of the wing 2 of interest and which will be described further with reference to FIGS. 2-5 is indicated by the box marked 'Detail A' in FIG. 1, although it will be appreciated that due to the symmetry of the aircraft the exact same considerations apply in mirror form for the starboard wing of the aircraft 1.

Figure 2:
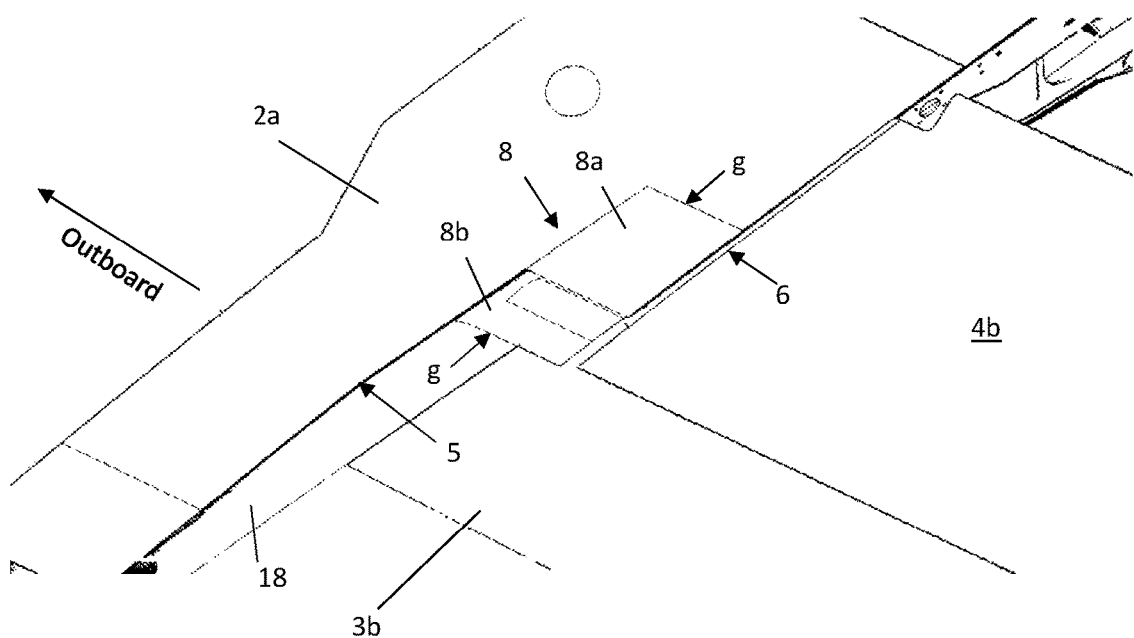
FIG. 2 illustrates a detailed view of the outboard flap and spoiler of the aircraft wing and a seal assembly between the fixed wing, the spoiler and the flap, with the flap and spoiler in their nominal cruise positions.
Figure 3:
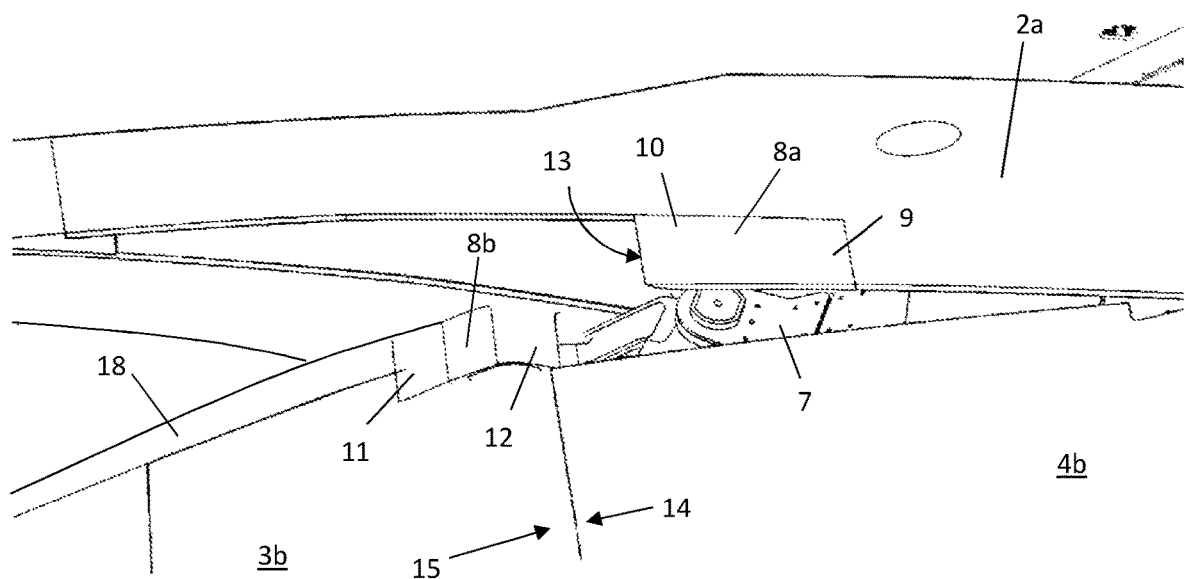
FIG. 3 illustrates a further detailed view with the flap deployed and spoiler drooped in a high lift configuration.

FIG. 2 shows a perspective view of the region indicated as Detail A in FIG. 1. As shown in FIG. 2, the aircraft wing has a fixed wing structure 2a which supports the outboard flap 3b and the outermost outboard spoiler 4b. The outboard spanwise wing direction is indicated in FIG. 2. In FIG. 2 the outboard flap 3b and the outboard spoiler 4b are shown in their nominal cruise (0 degree) retracted positions in which upper surfaces of the flap 3b and spoiler 4b are substantially conformal with the upper aerodynamic surface of the fixed wing portion 2a. The flap 3b has an outboard edge 5 and the spoiler 4b has an outboard edge 6. The outboard edge 5 of the flap 3b is positioned further outboard in the wing spanwise direction than the outboard edge 6 of the spoiler 4b. This offset between the outboard edges 5, 6, of the flap and spoiler 3b, 4b, may be driven by a variety of factors but in the present embodiment it is driven by the need to avoid conflict between the flap drive arm 7 (visible in FIG. 3) which supports and moves the outboard flap 3b between its retracted and deployed positions, and the outboard spoiler 4b when in its drooped position, as shown in FIG. 3. In the particular embodiment shown the flap drive arm is a swinging track but may be a part of any of a variety of known flap support mechanisms.

When the outboard flap 3b and the outboard spoiler 4b are in their nominal cruise (0 degree) positions, as shown in FIG. 2, the spoiler 4b overlays the leading edge of the outboard flap 3b, a gap 'g' is defined between the fixed wing structure 2a and the flap 3b in the region where the outboard spoiler 4b does not overlay the outboard flap 3b. To remove undesirable voids in the upper aerodynamic surface of the wing 2, a seal assembly 8 comprising a first seal member 8a and a second seal member 8b is provided to at least partially cover the gap 'g' between the fixed wing portion 2a and the outboard trailing edge flap 3b.

With reference to FIG. 3, the first seal member 8a has a first proximal portion 9 and a first distal portion 10. The first proximal portion 9 is fixed to the fixed wing structure 2a. The first distal portion 10 extends outwardly in the wing chordwise direction from the fixed wing structure 2a towards the outboard flap 3b. The second seal member 8b has a second proximal portion 11 and a second distal portion 12. The second proximal portion 11 is fixed to the outboard flap 3b. The second distal portion 12 extends outwardly in the wing chordwise direction from the flap 3b towards the fixed wing structure 2a. The first distal portion 10 of the first seal member 8a has an edge 13 at an extent thereof nearest the second seal member 8b.

As shown in FIG. 2, when the aircraft wing 2 is placed in its nominal cruise configuration such that the outboard flap 3b and the outboard spoiler 4b are both in their 0 degree positions, the edge 13 of the first seal member contacts the second distal portion 12 of the second seal member 8b so as to at least partially seal the gap 'g'.

FIG. 3 illustrates the aircraft wing 2 placed in a high lift configuration in which the outboard flap 3b is deployed so as to be rotated downwardly with respect to the fixed wing structure 2a. In this high lift configuration the spoiler 4b is also deployed to a downwardly deflected (negative rotation angle) drooped position with respect to the fixed wing structure 2a but may also remain in contact with the deployed flap 3b whereby the trailing edge 14 of the spoiler 4b contacts the leading edge 15 of the flap 3b. However, it will be appreciated that the spoiler 4b may alternatively droop but without making contact with the flap 3b, at least not through all negative rotation angles of the deployed flap 3b. When the wing 2 is placed in the high lift configuration shown in FIG. 3 the edge 13 of the first distal portion 10 of the first seal member 8a separates from the second distal portion 12 of the second seal member 8b.

Figure 4:
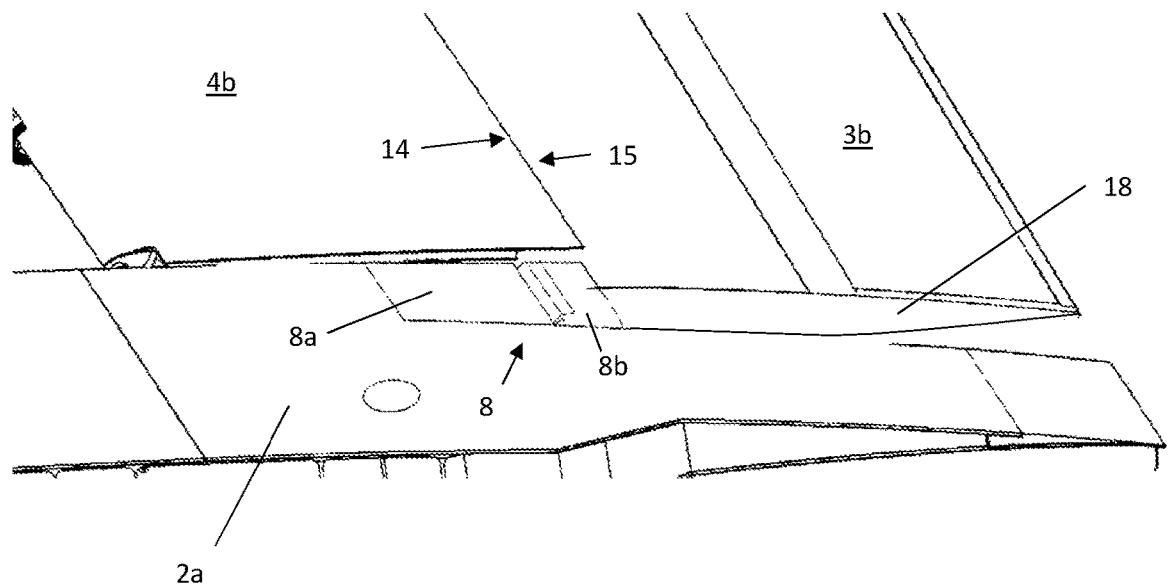
FIG. 4 illustrates a further detailed view with the flap and spoiler deflected upwardly as part of a variable camber wing system.

Turning next to FIG. 4, the wing 2 is placed in a high speed configuration in which the variable camber wing system moves both the flap 3b and the spoiler 4b through a relatively small rotation angle so as to be upwardly deflected (positive rotation angle) from the nominal cruise (0 degree) configuration. As discussed previously movements of the flap 3b and spoiler 4b by the variable camber wing system are limited to approximately +/−3 degrees from the nominal (0 degree) cruise position and throughout this limited range of movement the trailing edge 14 of the spoiler 4b remains in contact with the leading edge 15 of the flap 3b. As can be seen from FIG. 4, but shown better in the detailed view of FIG. 5, when the flap 3b is deflected upwardly from the nominal (0 degree) cruise position the edge 13 of the first distal portion 10 of the first seal member 8a presses against the second distal portion 12 of the second seal number 8b so as to deflect the second distal portion 12.

When the wing 2 is placed back in its nominal cruise position (shown in FIG. 2) the second distal portion 12 of the second seal member 8b returns to its undeflected state where the edge 13 of the first distal portion 10 of the first seal member 8a contacts the second distal portion 12 but without substantially deflecting the second distal portion 12. By maintaining contact, seal flutter may be avoided at high speed.

The first seal member is a seal panel formed from a relatively stiff material, such as carbon fiber reinforced composite or metal. The first seal member 8a is fixed to the fixed wing structure 2a by concealed fasteners across its forward edge. Due to the very limited space available, the first seal member 8a is unsupported at its other edges. However under normal operation of the variable camber wing system the first seal member 8a is sufficiently stiff so as to substantially not deflect outside the profile of the upper surface of the fixed wing structure 2a such that throughout all movements of the flap 3b and spoiler 4b the upper surface of the first seal member 8a remains substantially flush with the upper surface of the fixed wing structure 2a adjacent to the first seal member 8a.

By contrast, the second seal member 8b is formed from a resilient material, such as rubber or the like, different than the stiff material of the first seal member 8b and allowing compression of at least the second distal portion 12 of the second seal member 8b when the edge 13 of the first seal member 8a is caused to press against the second distal portion 12 during positive angle upward rotation of the flap 3b under the control of the variable camber wing system. The resilient material of the second seal member is sufficiently resilient to substantially revert to its original undeflected state when the pressing force of the edge 13 of the first seal member 8*a* is removed, e.g. when the wing 2 is returned to its nominal cruise configuration shown in FIG. 2 or a high lift configuration shown in FIG. 3.

In the illustrated embodiment the second distal portion 12 of the second seal member 8*b* is configured as a bulb seal having an outer surface 16 with a void 17 beneath the outer surface 16. As the edge 13 of the first distal portion 10 of the first seal member 8*a* presses against the outer surface 16 of the second distal portion 12 of the second seal member 8*b*, the outer surface 16 deflects into the void 17. In alternative embodiments the second distal portion of the second seal member may be constructed differently and may be formed, for example, of a deformable foam material.

As best shown in FIGS. 2-4 the outboard edge of the flap 3*b* has an edge seal 18 of conventional type for sealing between the moveable flap 3*b* and the fixed wing structure 2*a*. The second seal member 8*b* may be integrated with the flap edge seal 18.

The seal assembly 8 ensures that the edge 13 of the first seal member 8*a* remains in contact with the second distal portion 12 of the second seal member 8*b* throughout the full range of movement of the flap 3*b* and the spoiler 4*b* under the control of the variable camber wing system, which typically provides for a range of movement of the flap 3*b* of +/−3 degrees. In this way the seal assembly 8 at least partially covers the gap 'g' between the fixed wing structure 2*a* and the flap 3*b* in high speed wing configurations. The seal assembly 8 does not impact or interfere with the normal deployment of the spoiler 3*b* to its upwardly defected lift dump position. The seal assembly 8 also is not configured to maintain contact between the first seal member 8*a* and the second seal member 8*b* when the flap 3*b* is moved to one or more high lift configurations where the flap deployment 3*b* is typically significantly greater than the −3 degree maximum range of movement by the variable camber wing system.

Figure 5:
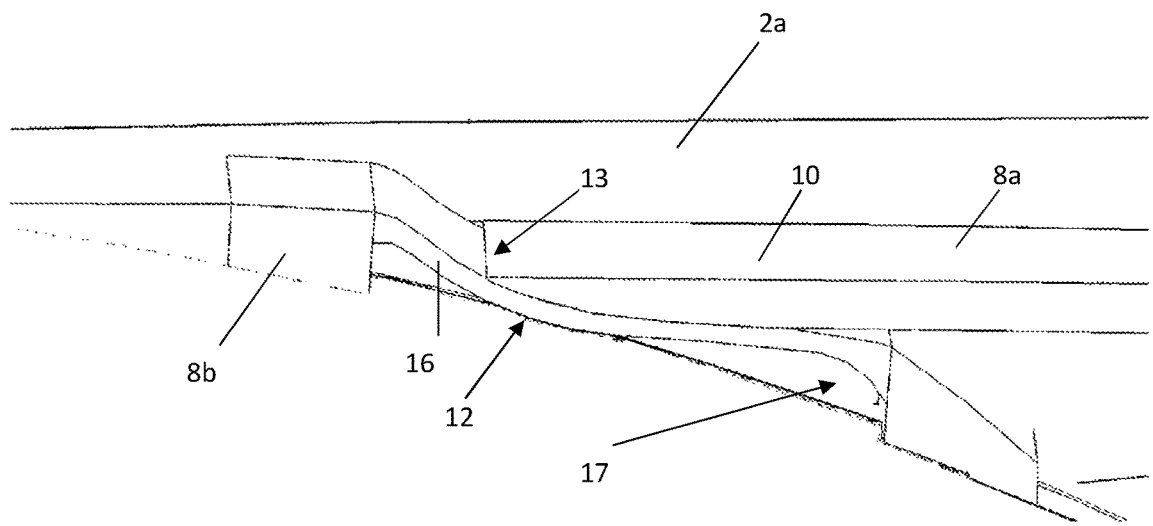
FIG. 5 illustrates a detailed view of the seal assembly with the flap and spoiler deflected upwardly as part of the variable camber wing system.

As best shown in FIG. 5 the lower or interior surface of the first distal portion 10 of the first seal member 8*a* is smoothly curved to taper towards the edge 13 such that the contact between the second distal portion 12 of the second seal member 8*b* and the first distal portion 10 of the first seal member 8*a* does not cause unnecessary wear on the seal members of the seal assembly 8, in particular the outer surface 16 of the second distal portion 12 of the second seal member 8*b*.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A seal assembly for an aircraft having a fixed aerofoil portion, a first control surface, a second control surface that partially overlays the first control surface, and a spanwise gap between the fixed aerofoil portion and the first control surface where the first control surface does not overlay the second control surface, the seal assembly comprising:
   a first seal member having a first proximal portion and a first distal portion, wherein the first proximal portion is configured to be fixed to the fixed aerofoil portion and the first distal portion is configured to extend outwardly from the fixed aerofoil portion towards the second control surface; and
   a second seal member having a second proximal portion and a second distal portion, wherein the second proximal portion is configured to be fixed to the second control surface and the second distal portion is configured to extend outwardly from the second control surface towards the fixed aerofoil portion,
   wherein the first seal member and second seal member at least partially seal the spanwise gap, and wherein the first distal portion has an edge at an extent thereof nearest the second seal member, and wherein the edge of the first distal portion is configured to press against the second distal portion and deflect the second distal portion so as to at least partially cover a chordwise gap between the fixed aerofoil portion and the second control surface.

2. The seal assembly according to claim 1, wherein the edge of the first distal portion deflects the second distal portion as the control surface moves relative to the fixed aerofoil portion.

3. The seal assembly according to claim 1, wherein the edge of the first distal portion deflects the second distal portion as the control surface rotates in a first direction relative to the fixed aerofoil portion, and wherein the edge of the first distal portion is configured to separate from the second distal portion when the control surface rotates in a second direction opposite the first direction.

4. The seal assembly according to claim 3, wherein the fixed aerofoil portion is a fixed wing portion and the control surface is a trailing edge flap and wherein the edge of the first distal portion is configured to press against the second distal portion as the trailing edge flap rotates upwardly relative to the fixed wing portion, and wherein the edge of the first distal portion is configured to separate from the second distal portion when the trailing edge flap rotates downwardly relative to the fixed wing portion.

5. The seal assembly according to claim 1, wherein the fixed aerofoil portion is a fixed wing portion and the control surface is a trailing edge flap.

6. The seal assembly according to claim 1, wherein the second seal member is formed from a resilient material and the first seal member is formed from a stiff material different than the resilient material.

7. The seal assembly according to claim 1, wherein the first seal member is a seal panel.

8. The seal assembly according to claim 1, wherein the second distal portion includes an outer surface, and the edge of the first distal portion is configured to contact the outer surface as the control surface moves relative to the fixed aerofoil portion.

9. The seal assembly according to claim 8, wherein the second distal portion includes a void beneath the outer surface into which the outer surface is configured to deflect as the edge of the first distal portion presses against the outer surface of the second distal portion.

10. The seal assembly of claim 1, wherein the fixed aerofoil portion is a fixed wing portion and the second control surface is a trailing edge flap, wherein the trailing edge flap is deployable between a first flap position in which the trailing edge flap conforms to a profile of the fixed wing portion, a second flap position in which the trailing edge flap is deflected upwardly from the first flap position, and a third flap position in which the trailing edge flap is deflected downwardly from the first flap position.

11. The seal assembly according to claim 10, wherein the first control surface is a spoiler which at least partially overlays the trailing edge flap, and wherein the spoiler is deployable between a first spoiler position in which the spoiler conforms to a profile of the fixed wing portion, a second spoiler position in which the spoiler is deflected upwardly from the first spoiler position, and a third spoiler position in which the spoiler is deflected downwardly from the first spoiler position.

12. The seal assembly according to claim 10, wherein the first control surface is a spoiler which at least partially overlays the trailing edge flap, and wherein the trailing edge flap is the most outboard flap across the wing spanwise direction, and the spoiler is the most outboard spoiler across the wing spanwise direction, and the trailing edge flap has an outboard edge positioned further outboard in the span wise direction than an outboard edge of the spoiler.

13. The seal assembly according to claim 12, wherein the first seal member is positioned between the outboard edge of the spoiler and the outboard edge of the trailing edge flap.

* * * * *